United States Patent Office 3,725,015
Patented Apr. 3, 1973

3,725,015
PROCESS FOR FORMING HIGH DENSITY REFRACTORY SHAPES AND THE PRODUCTS RESULTING THEREFROM
Gerald Q. Weaver, Princeton, Mass., assignor to Norton Company, Worcester, Mass.
No Drawing. Filed June 8, 1970, Ser. No. 44,624
Int. Cl. B22f 3/26
U.S. Cl. 29—182.1    9 Claims

ABSTRACT OF THE DISCLOSURE

A process for fabricating low porosity, essentially defect free, composite refractory shapes of novel composition. A powdered refractory material is mixed with a carbon containing substance and the mixture is cold formed into a desired shape; the preformed shape is then heat treated to convert the carbon containing substance to carbon. A molten metal bath is prepared, comprised of at least two metals, at least one of which is capable of reacting with the carbon in the preformed shape, and the combination of which results in a metallic mixture greater than that of the refractory material making up the matrix of the preformed shape. The perform is then heated and impregnated with the molten metal which results in sintering of the refractory material matrix, and the reaction of at least one of the metals with the carbon contained in the interstices formed by the particulate refractory material, to form metal carbide(s) therein. The composite shape is then removed from the molten metal bath and cooled. Because the coefficient of thermal expansion of the mixture of metals is close to or slightly greater than that of the refractory matrix, the composite shape cools to room temperature essentially free of cracks and residual stress.

BACKGROUND OF THE INVENTION

The invention relates to the manufacture of low porosity, composite refractory shapes. More particularly it pertains to new and improved composite refractory shapes which are manufactured by a unique method so as to result in metal carbide containing refractory composites essentially free of thermally caused defects.

Silicon carbide shapes are known, which have been manufactured by first cold pressing the shape from particulate silicon carbide to form a silicon carbide matrix, introducing a carbon containing or generating material into the silicon carbide matrix, followed by impregnation of this silicon carbide-carbon composite with silicon metal. The impregnation with silicon has been accomplished by exposing the cold formed pieces to silicon carbide vapors or by covering the preform with chips or granules of silicon metal and heating to a temperature above the sintering temperature of the silicon carbide and above the melting point of the silicon. The silicon vapor or molten silicon then penetrates the preform, and reacts with the carbon therein to form silicon carbide in the interstices of the silicon carbide matrix. This type of process is disclosed in U.S. Pats. 3,189,472 and 3,205,-043 to K. M. Taylor; U.S. Pat. 3,035,325 to A. C. Nicholson et al.; and U.S. Pat. 2,907,972 to W. E. Schildhauer et al. Similarly, boron nitride-silicon carbide composite refractory shapes have been fabricated by mixing various proportions of particulate boron nitride and silicon metal, cold forming said mixture, and exposing the preformed shape to heat and carbon dioxide. Under these conditions the carbon dioxide reacts with the silicon metal to form silicon carbide. This is described by K. M. Taylor in U.S. Pat. 2,887,393. All of these methods involve the in situ formation of silicon carbide.

The foregoing methods of fabricating composite refractory articles are capable of producing useful refractory shapes, they do, however, contain inherent shortcomings. Principal among these is the frequent occurrence in the finished article of residual stresses and possible microcracks resulting from a mismatch in the thermal expansion of the phases present. For example, in a silicon impregnated boron carbide carbon mixture one obtains silicon carbide with an expansion coefficient of $5.5 \times 10^{-6}$ in./in./° C.—boron carbide $6.0 \times 10^{-6}$ in./in./° C. and silicon $3.9 \times 10^{-6}$ in./in./° C. The prior art teaches the use of an elemental metal for impregnating and thus one must suffer this thermal expansion mismatch.

It is an object of the present invention to provide a means whereby thermal stresses and microcracking can be regulated by control of the impregnating metal composition. Alloys may be prepared which have mechanical properties similar to that of the desired parent metal but whose thermal expansion has been modified to match that of the refractory materials present. Also, a mixture of metals may be used where widely different melting points allow the majority of thermal stresses to be taken up in the low melting point material while it is still in the liquid state.

A further object of the invention is to provide composite refractory shapes of high strength and low porosity which are essentially free of defects resulting from thermal expansivity differences between the various components of the composite.

DESCRIPTION OF THE PREFERRED EMBODIMENTS

The present invention facilitates the use of alloys or metal mixtures because it provides the proper proportions in the melt of metals of widely varying melting points or vapor pressures. It thus provides a ready source of the desired proportions, subsequently a control of thermal stresses.

Such control of thermal stresses allows one to minimize these stresses or to create sometimes desirable stresses (e.g., compressive on the grains).

An additional advantage of the current process is that such impregnating alloys, or mixtures, can also be tailored to meet other desired characteristics. For example, impregnation rates can be greatly increased by designing an alloy or mixture that will provide good wetting of the piece, and unwanted side reactions can be minimized by saturating the melt with the product of such undesired reactions.

It is indeed surprising that such a system may be used to form evenly and fully impregnated materials in a very short time without the presence of undesired side reaction. For example, in the impregnation of a boron carbide carbon composite with an aluminum, silicon, boron alloy complete impregnation takes place in less than three minutes exposure to liquid metal.

According to the preferred teachings of the present invention high strength refractory shapes are manufactured by first cold forming a relatively porous refractory shape from a mixture of a particulate refractory material and a carbon containing substance. 65 to 90 parts by volume of a powdered refractory material such as boron carbide, titanium diboride, molybdenum silicide, zirconium boride, silicon boride, zirconium boride, silicon nitride, beryllium boride, titanium carbide, and mixtures of these are blended with 10 to 35 parts by volume of a carbon containing substance. Such carbon containing substance may be an organic binder material or elemental carbon. Organic materials such as furfuryl alcohol, furfural, phenol-formaldehyde condensation resin, and the like may be used, the only prerequisite being that when these organic materials decompose thermally, they leave behind a substantial carbon residue.

With respect to the particle size of the powdered materials which enter into the mixture, comminuted powders which have a maximum particle size of about 350 microns are preferred. This, however, is not to be construed as a limitation for there are essentially no rigid particle size parameters with respect to the present invention except those imposed by the properties desired in the final product. Conventional powder forming technology applies here but does not constitute any part of the present invention per se. The powdered refractory material and the carbon containing substance may be blended in any of the many available commercial blenders.

The mix may then be dried either at room temperature or at temperatures up to 120° C. if the organic binder additive contains volatiles, the temperature preferred depending on the particular organic binder material selected. It is desirable to remove as much of the volatiles contained in the organic binder material as possible, however, excessive heating should be avoided so that the organic material does not polymerize to any great extent.

The mix is pressed into the desired shape by any of the standard pressing techniques such as isostatic, uniaxial, vibratory, or even extrusion if the shape warrants such a method. If pressure forming is employed, the amount of pressure will be dictated by the thickness of the shape and the density desired. For most usable thicknesses and shapes a minimum of 400 to 500 p.s.i. is desirable, but the preferred pressure range is of the order of magnitude of 4,000–10,000 p.s.i. Because the preforming step is carried out at room temperature, conventional molds may be used, e.g. molds constructed of steel. The preformed shape is then removed from the mold and subjected to a heat treatment sufficient to cause decomposition of the organic binder material.

The next step in the process is sintering of the particles of the refractory material matrix and/or the in situ formation of metal carbides in the interstices formed by said matrix. Quantities of at least two metals are placed in a refractory crucible, the crucible placed in an appropriately constructed furnace, a non-oxidizing atmosphere is supplied to the furnace chamber, and the temperature therein raised to or above the melting point of the mixture of metals.

The relative amounts of the metals are selected on the basis of their coefficients of thermal expansion so as to result in a mixture with a coefficient of thermal expansion close to that of the refractory material. Preferably, the metal mixture is comprised of from 75 to 99 parts by volume of a metal selected from the group silicon, chromium, iron, nickel, titanium, and mixtures of these, 1 to 25 parts by volume of a metal selected from the group aluminum, copper, cobalt, iron, and mixtures of these, and 0 to 24 parts by volume of the metal which constitutes the metal portion of the refractory material. Improved results may accrue from the incorporation of the latter metal, by virtue of it saturating the impregnating metal alloy and preventing the leaching out of some of the metal constituent of the refractory material by dissolution in the molten metal mixture. For example, if boron carbide is the refractory material constituting the matrix, the incorporation of about 6% by volume of boron in the molten metal mixture saturates the molten metal mixture adequately to prevent its dissolving boron out of the boron carbide. The furnace temperature and the molten metal mixture are maintained at a temperature sufficient to facilitate impregnation, preferably from 800 to 2,400° C. (or sufficient to cause impregnation) while maintaining a non-oxidizing atmosphere within the furnace chamber and about the metal mixture. The non-oxidizing atmosphere may be a vacuum, or argon, neon, nitrogen, hydrogen or mixtures of these gases.

The preformed carbon containing refractory shape is then placed in a rack or other suitable means for holding the shape, within the non-oxidizing atmosphere containing chamber of the furnace. The rack and preform are immersed into the molten metal bath, which is being maintained preferably at 800 to 2,400°C., the rate of immersion being preferably from 4 to 48 inches per minute. When the preform is totally immersed, it is maintained in that position for a time sufficient to facilitate impregnation of the preform by the molten metal mixture, and to bring about reaction of a substantial amount of the molten metal with the carbon occupying the interstices formed by the particles of refractory material. Simultaneously the refractory material particles are sintered. The refractory shape is then withdrawn from the molten metal bath into the non-oxidizing atmosphere of the furnace. While maintaining a non-oxidizing atmosphere about the refractory shape, its temperature is gradually reduced to approximately room temperatture at a rate of up to 150° C. per minute.

The resultant product is essentially a finished product except for minor processing steps normally inherent in the final stages of production of such a product. Photomicrographs show that the refractory shape so fabricated is of low porosity, devoid of thermal stresses, and microcracks. It is composed of 60 to 90 parts by volume of a sintered refractory material matrix, and 10 to 40 parts by volume of interstitial space which is occupied by 5 to 34 parts by volume of at least one metal carbide formed in situ by the reaction of the molten metal mixture and the elemental carbon contained in the unsintered refractory material shape, and 5 to 35 parts by volume of the interstices being occupied by unreacted metal mixture. If the metal, corresponding to the metallic portion of the refractory material matrix was incorporated in the molten metal mixture, then it too will be present in the interstitial volume partially as the carbide of said metal and partially as the metal itself.

The novel refractory composition of the present invention has been found useful as an armor material for protection against penetration by ballistic projectiles. It is useful in such wear resistant applications as sandblast nozzles, pulp refiner plates, stator blades, liners in ore chutes, cutting tools, crucibles and other laboratory ware and the like. These materials are also highly useful in true refractory applications such as combustion chamber liners, rocket exhaust nozzles, lens fusion blocks, and kiln furniture.

The following specific example will serve to further elucidate the manner in which the present invention is practiced.

EXAMPLE

Refractory tiles 9 x 9 x 0.35" were fabricated in the following manner:

A batch of boron carbide powder was prepared by mixing in a twin shell V-blender 300 lbs. of boron carbide having an average particle size of 9 microns, and 300 lbs. of boron carbide having an average particle size of between 86 and 216 microns. The boron carbide contained about 76% by weight of boron. 150 lbs. of the blended mixture of boron carbide powders were placed in a Littleford Lodge precision mixer Model #SM130–D. While the powders were being stirred, 18 lbs. of Fapreg P–5 (furfuryl alcohol containing a polymerization catalyst, manufactured by Quaker Oats Company) was added through the upper opening of the mixer. When all of the Fapreg P–5 had been added, the comminuter blade was started and the mixing continued for 7 minutes, after which, mixing was stopped and the Fapreg P–5 wetted boron carbide mixture was removed from the mixer. At this point the wet mixture was comminuted through a 4-mesh screen to break up any lumps that were present and to further homogenize the mixture.

The next step in the process was that of pressing of the 9 x 9" tiles. A conventional steel mold having both top and bottom plates and a cavity measuring 9 x 9" was set in position. With the bottom plate in position and the top plate removed, 906 grams of the Fapreg P-5 wetted boron carbide powder was placed in the mold and leveled, and the top plate put into position. The mold set up was then placed in a hydraulic press and a pressure of 5000 p.s.i. was applied. The mold was then disassembled and formed tile or plate was removed.

Eight plates made in this manner were then placed in a forced convection oven where they were subjected to temperatures of from room temperature to 250° C. over a period of approximately 24 hours, after which the plates were allowed to cool to room temperature.

A graphite crucible 14" deep was filled with a metal mixture made up of 88% by weight of silicon, 7% by weight of aluminum, and 5% by weight of boron.

The crucible was then placed in the bottom portion of a graphite lined induction furnace, the interior of the furnace measuring 14 inches in diameter and 40 inches high, and the preformed plates, loaded in a graphite rack, were located in the upper portion of furnace. The furnace was then purged with argon and a relatively constant flow of argon (15 liters/minute) was maintained through the furnace for the purpose of assuring a non-oxidizing atmosphere. The furnace was then heated to a temperature of 1,835° C. at which point the power input to the furnace was stopped and the temperature within the furnace allowed to drop from 1,835° C. to approximately 1,755° C. The 8 preformed tiles supported in the graphite rack were then lowered into the molten metal bath at a rate of about 12 inches per minute. When the plates had been completely immersed in the molten metal, they were allowed to remain there for 5 minutes which brought about sintering of the boron carbide particles in the preform, impregnation of the sintered preform by the molten metals, and reaction of the impregnant metals, particularly the silicon, with the carbon contained in the preform itself. The sintered impregnated tiles were then removed from the molten bath at a rate of about 12 inches per minute and the entire assembly elevated to the upper portion of the furnace. The furnace and the graphite rack and tiles contained therein were allowed to cool at a natural rate to room temperature, which took approximately 1 and ½ days.

The plates were then removed and their exterior surfaces cleaned of any excess metal. The final product then was a refractory tile composed of a sintered boron carbide matrix, the interstices of the boron carbide matrix being filled with a mixture of the carbides of the silicon and boron and some unreacted infiltrant metal.

Chemical analyses of the resulting tiles showed the following:

| | Percent by weight |
|---|---|
| Total carbon | 19.61 |
| Total boron | 47.04 |
| Total silicon | 24.36 |
| Total aluminum | 4.28 |
| Free silicon | 3.86 |

In addition, the tiles had an average Knoop microhardness $K_{100}$ of 2,800–2,900, modulus of elasticity (from sonic measurements) of approximately $52 \times 10^6$ p.s.i., a compressive strength range of 120,000–160,000 p.s.i., and a crossbending strength of 25,000–31,500 p.s.i. measured on a 2" span in 3-point loading.

While the present invention has been described in terms of specific embodiments, it is understood that many variations may be possible which are still within the scope of applicant's invention. For example, the mode for bringing about impregnation of the refractory preform set forth above, is that of immersion. In certain cases, however, impregnation may also be facilitated by contacting a large surface of the preform with a bath of molten metal, allowing the metal to be pulled up through the preform by capillarity; or, a solid granular metal mixture of the desired composition can be first prepared by mixing the various metals in the molten state, cooling to solidify, and then granulating the solid metal mixture, which is then used to essentially cover a refractory preform, followed by heating, thus causing the metal mixture to melt and impregnate the preform. Applicant prefers the immersion technique of impregnation.

These and other variations which may become apparent to one skilled in the art are intended to be included within the scope of the present invention, the metes and bounds of which are set forth in the appended claims.

What is claimed is:

1. A method of manufacturing a low porosity refractory article containing at least one interstitial metal carbide, which comprises the steps of:

blending a powdered refractory material with a carbon containing substance, said powdered refractory material having a numerical average particle size of less than 350 microns and selected from the group consisting of boron carbide, titanium diboride, aluminum boride, chromium boride, silicon boride, chromium carbide, titanium carbide and mixtures thereof, said blend of powdered refractory material and carbon containing substances consisting essentially of 65 to 90 parts by volume of said refractory material and 10 to 35 parts by volume of said carbon containing substance;

devolatilizing said blend of refractory material and carbon containing substance to remove volatiles, under such conditions as to avoid substantial loss and polymerization of said carbon containing substance;

forming said blend of refractory material and carbon containing substance into a desired shape;

heat treating said shape so as to cause said carbon containing substance to decompose into a carbon residue;

impregnating said carbon containing refractory shape with a molten metal mixture consisting essentially of 75 to 99 parts by volume of a metal selected from the group consisting of silicon, chromium, iron, nickel, titanium, and mixtures thereof, 1 to 25 parts by volume of a metal selected from the group consisting of aluminum, copper, cobalt, iron, and mixtures thereof, and 0 to 24 parts by volume of the metal which is the metal constituent of said refractory material, while maintaining a non-oxidizing atmosphere about said molten metal mixture and said refractory shape at a temperature of 800 to 2,400° C. so as to facilitate uniform impregnation of said refractory material and reaction of a substantial amount of said molten metal with said carbon residue; and withdrawing said impregnated refractory shape from contact with said molten metal mixture and cooling.

2. The method of claim 1 wherein said carbon containing substance is essentially 100% organic binder, said organic binder being selected from the group consisting of phenol-aldehyde condensation resin, furfuryl alcohol, furfural, and furan resin.

3. The method of claim 2 wherein said non-oxidizing atmosphere is selected from the group consisting of argon, neon, nitrogen, hydrogen, and mixtures thereof.

4. The method of claim 2 wherein said non-oxidizing atmosphere is a vacuum.

5. The method of claim 3 wherein said refractory material is boron carbide, said carbon containing substance is furfural alcohol, said molten metal is composed of 75 to 99 parts by volume of silicon, 1 to 25 parts by volume of aluminum, and 0 to 24 parts by volume of boron, and said non-oxidizing atmosphere is argon.

6. The method of claim 5 wherein said blend of refractory material and carbon containing substance is freed of volatiles by heating at a temperature of 90–120° C. for 24–48 hours, the rate of immersion of said shape into said molten metal bath is about one foot per minute while said bath is maintained at 1,700–1,900° C., maintaining said shape immersed in said molten metal for 5–15 minutes, withdrawing said shape at a rate of about 6 inches per minute into a non-oxidizing atmosphere maintained at about 1500° C., and allowing said shape to cool to room temperature at a rate of about 75° C. per hour.

7. A low porosity refractory article consisting essentially of a sintered refractory material having a numerical average particle size of less than 350 microns and is selected from the group consisting of boron carbide, silicon boride, titanium boride, titanium carbide, zirconium carbide, zirconium boride, silicon nitride, beryllium boride, and mixtures thereof; at least one metal carbide occupying the major portion of the interstices formed by the particles of said sintered refractory material matrix, said metal carbide being selected from the group consisting of silicon carbide, cobalt carbide, chromium carbide, iron carbide, aluminum carbide, nickel carbide, beryllium carbide, boron carbide, and mixtures thereof; and an alloy of at least two metals filling the remainder of said interstices, one of the metals of said alloy being the same as the metal portion of said metal carbide and the remaining metal being one selected from the group consisting of aluminum, copper, cobalt, iron, and mixtures thereof; said refractory article being essentially free of defects arising from the difference in thermal expansivity of said principal metal carbide and said metal alloy.

8. The low porosity refractory article of claim 7 wherein said interstices formed by said sintered particles of said refractory material matrix constitute from 10 to 40 parts by volume of the total volume of said article, said metal carbide occupies from 5 to 35 parts by volume of said interstices and said metal alloy occupies the remainder of the total volume of said interstices.

9. The low porosity article of claim 8 wherein said sintered refractory material matrix is boron carbide, said metal carbide is silicon carbide, and said metal alloy consists essentially of from 82 to 94 parts by volume of silicon and from 6 to 18 parts by volume of aluminum.

References Cited
UNITED STATES PATENTS
3,246,275    4/1965    Schrewelius _____ 29—182.1

OTHER REFERENCES
Henderson, Metallurgical Dictionary, 1953, Reinhold Publishing Corp., p. 11.

CARL D. QUARFORTH, Primary Examiner

B. HUNT, Assistant Examiner

U.S. Cl. X.R.

29—182.5, 182.7, 182.8; 75—200, 201, 202, 203, 204